United States Patent [19]

Brandes et al.

[11] 4,356,145
[45] Oct. 26, 1982

[54] PROCESS FOR LOADING THE REACTOR CAVITY OF A NUCLEAR REACTOR

[75] Inventors: Siegfried Brandes, Ladenburg; Henri-Emile Pesch; Uwe Gutsch, both of Mannheim, all of Fed. Rep. of Germany

[73] Assignee: Hochtemperatur-Reaktorbau GmbH, Cologne, Fed. Rep. of Germany

[21] Appl. No.: 157,383

[22] Filed: Jun. 9, 1980

[30] Foreign Application Priority Data

Jun. 11, 1979 [DE] Fed. Rep. of Germany ....... 2923639

[51] Int. Cl.³ .......................................... G21C 19/00
[52] U.S. Cl. .................................... 376/265; 376/267; 376/381
[58] Field of Search ........... 176/30, 58 PB, 90, 91 SP; 376/264, 265, 267, 381

[56] References Cited

U.S. PATENT DOCUMENTS

| | | | |
|---|---|---|---|
| 4,110,158 | 8/1978 | Maly | 176/58 BP |
| 4,148,685 | 4/1979 | Brandes | 176/58 BP |
| 4,243,487 | 1/1981 | Schweiger | 176/58 BP |

FOREIGN PATENT DOCUMENTS

| | | | |
|---|---|---|---|
| 248562 | 8/1966 | Austria | 176/58 BP |
| 2738729 | 3/1979 | Fed. Rep. of Germany | 176/58 BP |

*Primary Examiner*—Donald P. Walsh
*Attorney, Agent, or Firm*—Schwartz, Jeffery, Schwaab, Mack, Blumenthal & Koch

[57] ABSTRACT

Disclosed is a process for reloading the contaminated empty reactor cavity of a nuclear reactor with spherical operating elements forming the core of a high temperature reactor comprising supplying the operating elements to the reactor cavity first through a central loading tube in the roof reflector of the nuclear reactor to a predetermined load level, the loading tube being extended at the onset of the loading process toward the floor reflector and being adjusted upwardly during continued loading with the rising load level and after reaching the predetermined load level, supplying further operating elements through a plurality of auxiliary loading tubes in the roof reflector of the nuclear reactor in concentric circles about the central loading tube with the loading sequence proceeding circle after circle beginning with the circle closest to the central loading tube.

7 Claims, 3 Drawing Figures

PROCESS FOR LOADING THE REACTOR CAVITY OF A NUCLEAR REACTOR

BACKGROUND OF THE INVENTION

1. Field of the Invention

The invention relates to a process for loading the reactor cavity of a nuclear reactor housed in a reactor pressure vessel. More particularly, the invention is directed to a process for the reloading of an emptied reactor cavity surrounded on all sides by a reflector. The loading of the cavity with operating elements is accomplished through a central loading tube in the roof reflector and a plurality of auxiliary loading tubes concentrically arranged around the central loading tube. At least one discharge tube is arranged in the floor reflector for the eventual removal of the operating elements.

During the piling of the core of a high temperature reactor with spherical operating elements in the cavity of the reactor pressure vessel, the impact velocity of the operating elements on the floor reflector or on the operating elements already loaded must be controlled to preserve the floor reflector and the operating elements, and to prevent the undesirable cracking of the operating elements. This may be achieved by installing certain devices in the loading tubes to reduce the exit velocity of the operating elements. For example, a section of the loading tubes may have the configuration of a spiral or a section may have a braking gas flowing in a direction opposite to that of the operating elements. The loading tubes may further be designed so that their length may be adjusted to the existing height of the pile, i.e. the tubes for example may be telescope-like and may extend initially close to the floor reflector and progressively against the surface of the pile of operating elements.

2. Background of the Prior Art

The normal operation of a high temperature reactor with spherical operating elements requires approximately forty loading tubes. These tubes are equipped with the above-mentioned devices for controling the velocity of the falling operating elements. For the initial loading of the core where a drop height greater than in normal operation must be considered, it is necessary to install additional devices which may be of the type already described hereinabove. As the reactor cavity has not been contaminated at this point in time, these devices are easily handled and removed because normally they are used only once.

It is possible, however, that as the result of exposure of high doses, parts of the side reflector must be replaced, following a longer period of operation. For this purpose, the reactor cavity must be emptied of operating elements and then reloaded at a later time. This is an expensive operation. Because of its contamination, the reactor cavity is inaccessible so that auxiliary devices may be installed and removed by means of remote control only.

When these auxiliary devices are installed in every one of the loading tubes required for normal operations, the expense for the case of one-time use becomes disproportionally high.

In the prior art, it is known to provide a device for the braking of discrete elements, for example, fuel elements of a nuclear reactor, which are being transported by means of a gas into a space. In this device described in West German Utility Model No. 1 922 608, a braking gas is introduced into the space and flows in a direction opposite to that of the elements exiting from the supply line into the reactor cavity. The velocity of the elements is substantially reduced in this fashion. This known installation is adequate for the normal operation of a nuclear reactor, but is not adequate for the circumstances involving the complete reloading of the reactor core.

It is further known from West German Offen. No. 27 38 729 to mount an annular collar on the lower edge of the roof reflector in a nuclear reactor utilizing spherical operating elements. The collar extends to the surface of the pile of fuel elements. Again, this device is adequate for normal operations only.

West German Pat. No. 1 281 046 similarly describes a loading device for a nuclear reactor with spherical fuel elements wherein the fuel elements are transported through a plurality of standpipes into an inclined tube, so that they roll down and finally drop onto the surface of the pile of fuel elements. This installation contains no arrangement for limiting the impact velocity of the fuel elements.

West German Published Application No. 1 223 465 describes another nuclear reactor with spherical operating elements, wherein at least one loading tube for the addition of fresh fuel elements is provided over the core of the reactor. This loading tube is mounted in a mobile cover which rests directly on the pile of fuel elements and compresses it. The loading tube moves together with the cover. The cover continuously applies a hold-down force to the pile through which a cooling gas is flowing from the bottom to the top. The cover thus acts against the lifting of fuel elements.

The state of the art further includes loading installations for gas cooled nuclear reactors having a core comprising a moderator structure with a plurality of channels, wherein the fuel elements are located. As shown for example in West German Published Application No. 1 192 334, such a loading installation comprises a magazine for the stacking of fuel elements, a gripper and a loading tube connectable with the upper end of each of the fuel element channels.

Based on this state of the art, it is an object of the invention to provide a process for the reloading of a contaminated reactor cavity with spherical operating elements which makes it possible to load the reactor cavity by means of a simple auxiliary device while the drop height of the elements is sufficiently reduced.

The solution of the problem and process of the invention is characterized by a two-step loading process, wherein in a first step the operating elements are loaded to a predetermined load height only through the central loading tube that is extendable in the manner of a telescope, and wherein in a second step beginning at a predetermined level of the load, further loading is effected additionally or exclusively by means of the non-extendable loading tubes arranged in concentric rings about the central loading tube. The central loading tube is extended at the onset of the loading process to the floor reflector and adapted in its length during continued loading to the prevailing load level. The sequence of loading through the non-extendable or auxiliary loading tube is determined by the increasing distance from the central loading tube.

The process of the invention represents a readily controlled, continuously operated method for the loading of the reactor cavity, whereby the components of the reactor as well as the spherical operating elements are preserved. Of the approximately forty loading tubes of a medium size high temperature reactor, only one, i.e. the centrally or approximately centrally arranged loading tube, is equipped with an auxiliary device. Thus, the expense of reloading the reactor cavity is limited should reloading become necessary. The auxiliary device comprises means for extending the central loading tube into the reactor cavity, such as in a telescoping fashion.

Initially, the central loading tube is extended to the bottom of the reactor cavity and loading is effected through this tube until a central, cone-shaped pile of operating elements has been built up. The loading tube is then slightly contracted upward and the loading process resumed. This process is repeated until a predetermined load level is attained. During all of these loading steps, the impact velocity of the operating elements is strongly reduced. Once this point has been reached (as the drop height of the operating elements is now low enough) loading is effected additionally or exclusively by means of the auxiliary loading tubes arranged in rings or circles about the extendable loading tube. In the process, first the inner rings of tubes and then the outer rings of tubes are used.

In order to obtain the neutron flux desired together with a predetermined radial power density distribution, it is frequently necessary to divide the reactor core into areas with different fissionable material concentrations. According to an advantageous further development of the invention, such a division into zones may be achieved by means of the process described herein. The stepwise addition of operating elements with differential fissionable contents is made possible according to the present invention. By virtue of the angle of repose, oblique and outwardly declining stratifications of the operating elements are obtained. Each stratification contains a different fissionable composition.

As an example, a radius issuing from the central loading tube intersects a plurality of reactor core zones with different loads. Therefore, by means of the suitable selection of operating elements with respect to their fissionable content, the desired radial power profile of the reactor core may be obtained.

At elevated temperatures with spherical operating elements, the elements of the lower layers, as the result of burnup, contain less fissionable material than the fresh fuel elements of the upper layers. This fact may be taken into consideration by chosing the fissionable content of the operating elements so that it increases with the load level. With such a graduation of the fissionable content in the axial direction simultaneously (because of the inclined position of the layers) an increase in the fissionable material in the radially outward direction is also obtained. This is desirable, in order to increase the neutron flux in the peripheral zones. It is, therefore, possible with the process of the invention to simulate a zone structure of the reactor core corresponding to the equilibrium core, wherein the fissionable content is increasing toward the edge.

In another embodiment of the process according to the invention loading is effected with the central loading tube alone, until the cone-shaped pile produced by this tube attains the full height of the reactor core, whereupon subsequent loading is effected exclusively with the auxiliary loading tubes arranged on the circles.

Initially as previously described, a predetermined quantity of operating elements with a predetermined fissionable content are loaded through the central loading tube. The central loading tube is then intermittently drawn in an upward direction, while in each step operating elements with a different fissionable composition are added. The fissionable content increases toward the termination of the loading process. When the apex of the central cone-shaped pile attains the height corresponding to the fully loaded reactor core, loading through the central tube is discontinued and subsequent loading is effected with a new mixture of operating elements through the ring or annulus of the closest auxiliary loading tubes, until the conical pile of these tubes also attains the height of the fully loaded reactor core. The loading tubes located on subsequent rings or annuli are used in a similar manner.

This embodiment also satisfies the physical requirements of the reactor with the single restriction that the power profile cannot be adjusted arbitrarily, because there is a coupling relationship between the axial and radial power density distribution. That is, each axial zone division chosen determines a corresponding radial zone division and vice versa. As shown by calculations, in case of the central loading of the reactor cavity to the full height of the reactor core, an optimum zone division in the radial direction (i.e. an approximately flat radial power density distribution) can be achieved only when the axial power density distribution increases only moderately in the upward direction. However, in a high temperature reactor with a single passage of the spherical fuel elements, there is an axial profile of power distribution exhibiting a maximum in the upper third of the reactor core. The choice during the reloading of the reactor cavity of a fissionable concentration corresponding to such a profile in the individual loading stages will result in an excess of the power density distribution in the radial direction and in the gas exit temperature profile in the boundary area of the reactor core.

The coupling relationship existing in the above-described embodiment of the process according to the invention between the axial and radial power density distributions is not of great importance for the operation of the reactor, because calculations indicate that after approximately 80 days the power density distribution is determined by the subsequently loaded fuel elements. That is, the power density distribution rapidly attains a stationary state by means of the turnover and reloading of the fuel elements.

If a somewhat greater drop height of the spherical fuel elements is acceptable, then according to yet another embodiment of the process of the invention, satisfactory neutron flux and temperature distributions may be obtained both in the axial and the radial directions. This embodiment is particularly suited for a medium size high temperature reactor with a single passage of the fuel elements. This embodiment is further characterized in that the loading with the central loading tube is only continued until the cone-shaped pile produced by this tube attains approximately ⅔ of the height of the reactor core. After this, the subsequent loading is effected alternatingly both through the central loading tube and through the auxiliary loading tubes arranged in rings or circles about the central loading tube.

A mixed loading strategy is, therefore, applied beginning at two-thirds of the height of the core, i.e. when an acceptably low drop height of the fuel elements has been attained and followed by loading initially with the tubes adjacent to the central loading tubes and then with the loading tubes following each adjacent ring of tubes in the outward direction. Following the use of all of the tubes, the process returns to the central loading tube, whereupon the above-described sequence is repeated until all of the conical piles attain the full height of the reactor core.

The distribution of fissionable material established by this loading process in the reactor core leads to an adequately flat radial power density distribution and to an axial power density distribution corresponding to that of a high temperature reactor with a single passage of the fuel elements.

In the drawing, the two main embodiments of the process according to the invention are represented schematically.

Figure 1:
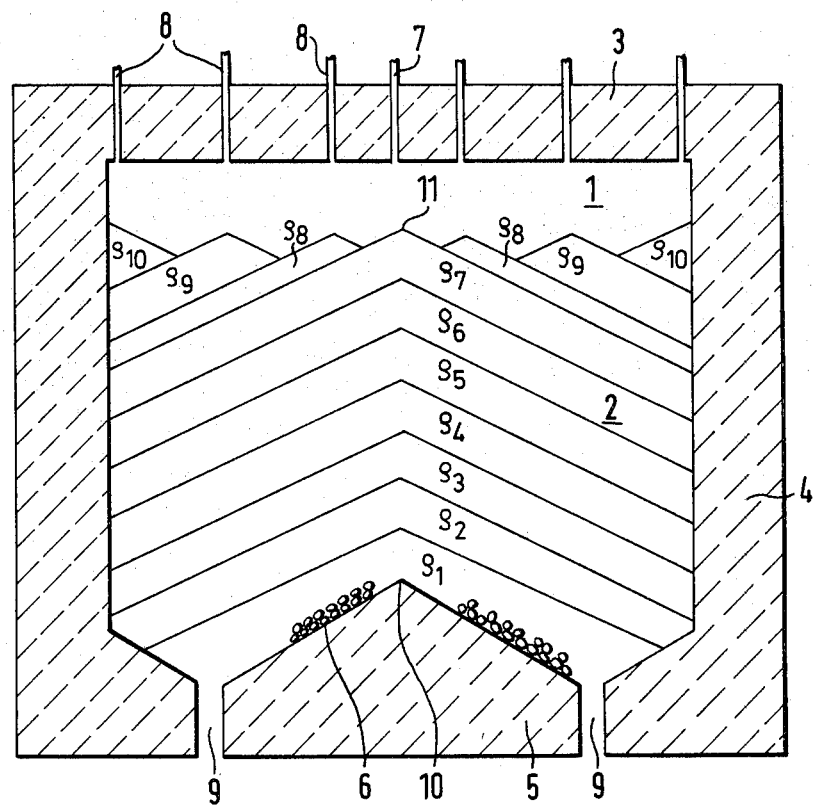
FIG. 1 shows step loading according to a first embodiment.

FIG. 1 exhibits a reactor cavity 1 located within a reactor pressure vessel wherein the core 2 of a high temperature reactor is comprised of a pile of a plurality of spherical operating elements 6. The cavity 1 is surrounded by a roof reflector 3, a cylindrical side reflector 4 and a floor reflector 5. A series of loading tubes is inserted through the roof reflector 3 for the purpose of the addition of the spherical operating elements 6. The series of loading tubes comprises a central or approximately central loading tube and auxiliary loading tubes 8, arranged on concentric circles around the loading tube 7. In one embodiment of the invention loading tubes 7 and 8 are equipped with conventional devices to limit the exit velocity of the operating elements 6. Several discharge tubes 9 for the removal of used operating elements are installed in the floor reflector 5.

The central loading tube 7 is extendable in a telescoping fashion and may be drawn down the floor reflector 5. The auxiliary loading tubes 8 are not extendable.

The loading of the cavity 1 is effected initially through the central loading tube 7, with operating elements having differential fissionable contents $\rho$ being added. The fissionable content of the operating elements 6 is chosen so that, in the layers being formed with fissionable contents $\rho_1, \rho_2 \ldots \rho_7$, etc., the fissionable content increases with the height, i.e. $\rho_1 < \rho_2, < \rho_3, < \rho_4$, etc.

To form the first layer with the fissionable content $\rho_1$, the central loading tube 7 is extended almost to the floor reflector 5, having a conically shaped area 10 with an angle of repose of approximately 23°. In a series of subsequent steps, the central loading tube 7 is withdrawn in the upward direction and loading is continued with the next group of operating elements of higher fissionable content forming the next layer. This process is repeated until the central conical pile 11 of the layer with the fissionable content of $\rho_7$, has attained the full height of the reactor core 2.

Charging through the central loading tube 7 is now discontinued and loading is continued with a new fissionable content $\rho_8$, through the plurality of loading tubes 8 forming a ring or annulus closest to and surrounding the loading tube 7. Subsequent loads are added (always with a new fissionable material composition) through each successive ring or annulus of loading tubes 8. Loading is complete when all of the conical piles have attained the full height of the reactor core 2.

Figure 2:
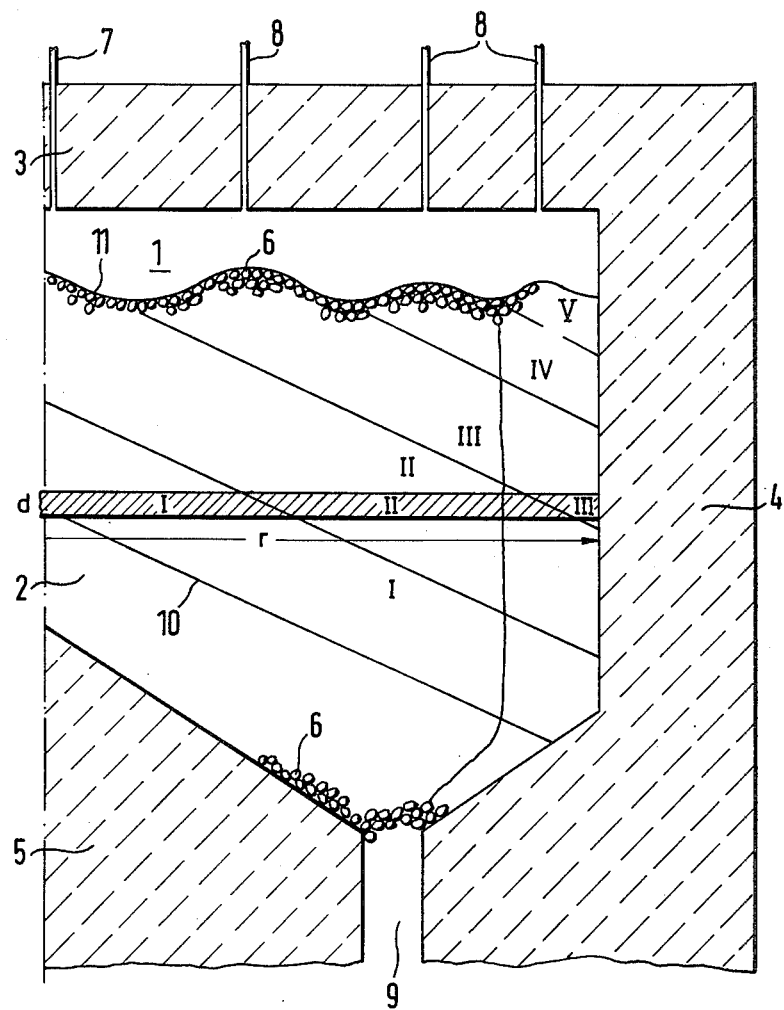
FIG. 2 depicts a partial longitudinal section through a fully loaded reactor core and FIG. 3 represents a step loading according to a second embodiment.

In FIG. 2, one-half of a fully loaded reactor core 2 is shown in a longitudinal cross section, wherein for the sake of simplicity, only a few layers with different fissionable contents are shown. To the extent that there is agreement between FIGS. 1 and 2, identical reference numerals are used.

The first layer of the operating elements 6 here consists of dummy balls, i.e. graphite balls without fissionable material. Subsequent layers contain operating elements with fissionable contents or mixtures I, II, . . . IV, etc. Because of the angle of repose, the layers occupy an inclined position, wherein the layers drop in the outward direction. A radius r passing through one-half of the reactor core thus intersects layers with different mixtures of the operating elements 6. For example, a section with the thickness d, as represented by the shaded area in FIG. 2 contains the mixtures I, II and III, with the mixture III located in the outermost zone having the highest fissionable content. A zone structure corresponding to the equilibrium of the core is thus present.

Figure 3:
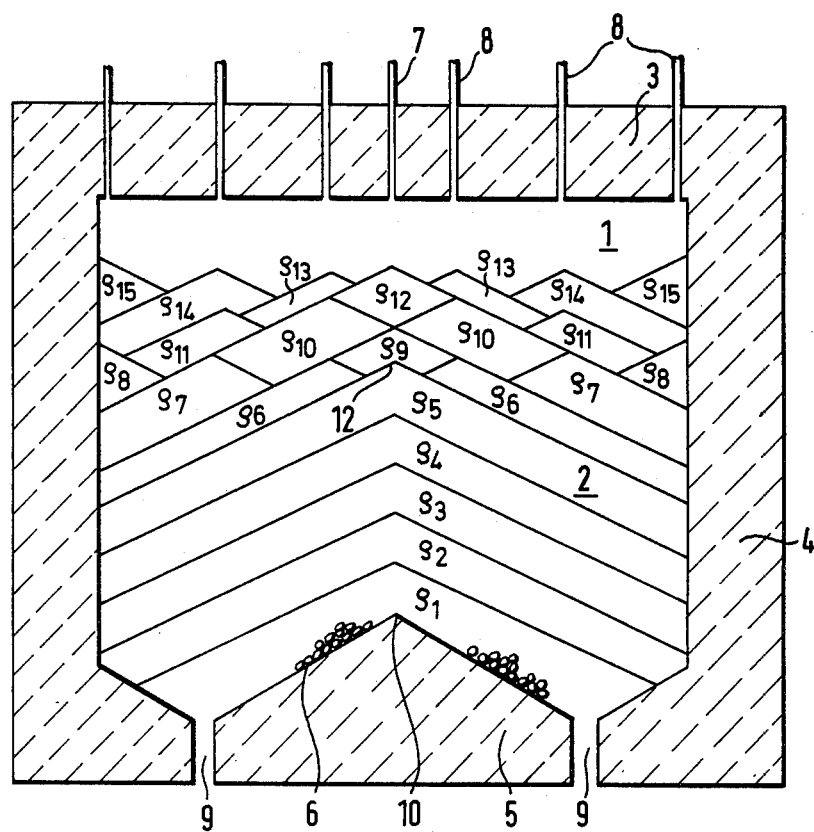

In FIG. 3 which serves to demonstrate yet another embodiment in the loading method of the invention, the reference numerals of FIGS. 1 and 2 are used again. Here again, a central loading tube 7 is provided which may be extended in a telescoping fashion to the floor reflector 5, together with a plurality of non-extending loading tubes 8, arranged on concentric circles around the central loading tube 7.

As described in connection with FIG. 1, loading is initially effected in discrete steps through the central loading tube 7, wherein a different fissionable content $\rho$ is added in each step, with said fissionable content increasing with height. Loading is effected as in the first variant and layers with fissionable contents $\rho_1, \rho_2 \ldots \rho_5$ are formed to a height of ⅔ of the full reactor core 2, i.e. until the central conical pile 12 attains the height.

After this initial loading procedure a mixed loading process is used, i.e. the loading tubes 8 and the central tube 7 are utilized alternatingly. First the loading tubes arranged on the innermost rings or annulus surrounding the center tube are used for the loading followed by the auxiliary loading tubes 8 of the outer rings or annuli. Layers are formed thereby with fissionable contents of $\rho_6, \rho_7, \rho_8$.

The central loading tube 7 is now used again ($\rho_9$) followed by the auxiliary loading tubes 8 in the sequence of their distance from the center of the core. In this manner, layers with fissionable contents $\rho_{10}, \rho_{11} \ldots \rho_{15}$, are formed. The loading process is complete when the conical piles of all of the loading tubes have attained the full height of the reactor core 2.

We claim:

1. A process for reloading the contaminated empty reactor cavity of a nuclear reactor with spherical operating elements forming the core of a high temperature reactor comprising:

supplying said operating elements to said reactor cavity first through a central loading tube in the roof reflector of said nuclear reactor to a predetermined load level, said loading tube being extended at the onset of the loading process toward the floor reflector and being adjusted upwardly during continued loading with the rising load level, and after reaching said predetermined load level, supplying further operating elements through a plurality of auxiliary loading tubes in the roof reflector of said nuclear reactor in concentric circles about said central loading tube with the loading sequence proceeding circle after circle beginning with the circle closest to said central loading tube.

2. The process of claim 1 wherein said central loading tube is extendable in a telescoping fashion.

3. The process of claim 2 wherein said central loading tube and said auxiliary loading tubes are equipped with means for limiting the exit velocity of said operating elements.

4. The process of claim 2 wherein said loading of said operating elements through said central loading tube continues during loading of said operating elements through the plurality of auxiliary loading tubes.

5. The process of claim 2 wherein said operating elements have different fissionable contents $p$ and are added in steps, with the fissionable content $p$ increasing as the load level increases.

6. The process of claim 2 or 3 wherein said first loading with said central loading tube continues until a conical pile produced by said tube attains the full height of the reactor core, and wherein subsequent loading is then effected exclusively by means of said auxiliary loading tubes.

7. The process of claim 2 or 3 wherein the first loading through the central loading tube continues until the conical pile produced by said central loading tube attains approximately ⅔ of the height of the reactor core and wherein subsequent loading is effected alternately through said central loading tube and said auxiliary loading tubes.

* * * * *